United States Patent Office 3,708,464
Patented Jan. 2, 1973

3,708,464
ANTISTATIC OLEFIN POLYMER COMPOSITIONS
Konrad Rombusch and Karl-Heinz Magosch, Marl, Germany, assignors to Chemische Werke Huls Aktiengesellschaft, Marl, Germany
No Drawing. Filed Dec. 4, 1970, Ser. No. 95,373
Claims priority, application Germany, Dec. 16, 1969,
P 19 62 921.1
The portion of the term of the patent subsequent to Oct. 31, 1989, has been disclaimed
Int. Cl. C08f 29/02, 29/04
U.S. Cl. 260—93.7   11 Claims

ABSTRACT OF THE DISCLOSURE

Antistatic olefin polymer compositions and molded articles of normally solid olefin polymers having uniformly and intimately distributed therein from 0.01 to 1.0 percent by weight of a tetrahydropyrimidine having the formula—

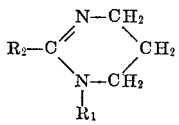

wherein $R_1$ is a straight chain or branched alkyl or alkenyl group having 6 to 26 carbon atoms, and $R_2$ is hydrogen or an alkyl or alkenyl group having 1 to 5 carbon atoms. The tetrahydropyrimidines may be mixed with up to molar equivalent amounts of organic or inorganic acids.

BACKGROUND OF THE INVENTION

The field of the invention is synthetic resins from polymerized unsaturated compouds of acyclic hydrocarbons and the invention is particularly concerned with antistatic agents for incorporation into olefin polymers.

The general state of the art of antistatic agents is disclosed in Kirk-Othmer, "Encyclopedia of Chemical Technology," 2nd ed., vol. 2 (1963), pp. 649–672, particularly pp. 665–667 wherein durable antistatic agents for plastics are disclosed, and pp. 668–671 wherein the tests for measuring static propensity are given. The state of the art of olefin polymers suitable for use in the present invention may be ascertained from Kirk-Othmer supra, vol. 4 (1967), under the section "Olefin Polymers," pp. 217–313.

The state of the art of incorporating antistatic agents into polymers may be ascertained by reference to Belgian Pats. 536,632, 655,182, 655,183, 645,800; French Pats. 1,377,803 to 1,377,808, 1,345,827, 1,322,626; British Pat. 731,728 and U.S. Pats. 2,992,205, 3,234,170, 3,435,021, 3,438,955, 3,441,552 and 3,485,786.

The preparation of tetrahydropyrimidines as used in the present invention is disclosed in U.S. Pats. 2,961,308 and 3,020,276, Belgian Pat. 625,362 and British Pats. 793,749 and 976,547.

According to U.S. Pat. 3,485,786 of Rombusch, olefin polymers such as polyethylene and polypropylene have hydroxy ethylated or hydroxy propylated alkoxypropyl amines such as n-dodecyloxypropyl-N-hydroxyethyl-N-hydroxyethyl-amine incorporated therein as antistatic agents.

British Pat. 793,749 discloses the use of tetrahydropyrimidines as fungicides wherein the tetrahydropyrimidines have the general formula—

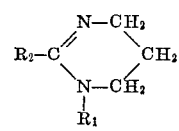

wherein $R_1$ is an aliphatic hydrocarbon radical having 6 to 18 carbon atoms, and $R_2$ is hydrogen or methyl.

British Pat. 793,749 discloses the preparation and use as fungicides of 1-octadecenyl-2-methyl-tetrahydropyrimidine, 1-hexadecyltetrahydropyrimidine and 1-N-dodecyl-2-methyl-tetrahydropyrimidine which are also useful in the present invention.

It is known that molded articles of polyolefins tend to attract dust during storage and use, due to electrostatic charging and as a result their utility is considerably reduced.

Various approaches have been suggested to avoid these difficulties. Thus, the surfaces of molded polyethylene articles are coated with a material which reduces electrostatic charging. However, such coating procedures exhibit the disadvantage that the effectiveness is lost as soon as the antistatic coating has worn off during normal use or cleaning. A more lasting effect is obtained by incorporating the antistatic additive into the polymeric substance and producing molded articles from these mixtures. Among these additives are, for example, quaternary ammonium salts, polyalkylene glycols, and polyalkylene glycol esters.

Still better antistatic properties are obtained by the oxyethylates of alkanols and alkylaryl phenols, for example, as suggested in Belgian Pat. 536,623 and British Pat. 731,728. However, these compounds tend to bleed out when amounts necessary for sufficient antistatic effectiveness are incorporated into the synthetic material.

A further increase in the antistatic effectiveness is obtained with nitrogen-containing compounds, such as, for example, amides and aminocarboxylic acid derivatives as disclosed in French Pats. 1,377,803 to 1,377,808, oxazolines and imidazolines and, to an even more considerable extent, with alkylamines as disclosed in Belgian Pats. 655,182 and 655,183, especially with oxyethylates of alkylamines as disclosed in Belgian Pat. 645,800, French Pats. 1,345,827 and 1,322,626, and U.S. Pat. 3,485,786 corresponding to German published application 1,228,-056. The bishydroxyethyl derivatives are the most effective of all the antistatic agents disclosed heretofore. However, these compounds often exhibit the disadvantage that, in the first few days after the manufacture of the molded article, only a minor surface film is formed and the additive is not immediately fully effective.

An electrostatic charge, which is generally very high, is generated due to the processing steps, e.g., during the mold separation in injection molding. Since the antistatic agent is not yet effective, the charge is dissipated at once and the molded articles become very unattractive due to attracted dust. This dust accumulation within a few days after molding is particularly critical where dust scattering is avoided only with difficulty. In the present invention, molded articles are understood to mean injection molded, extruded, and deep-drawn articles.

Among the cyclic compounds, a large number of 2-fatty-alkyl oxazolines and imidazolines, as well as the N-derivatives thereof are described in the patent literature. However, regard to the tetrahydropyrimidines, only specific esters are set forth along with other heterocyclic compounds, e.g.;

$$\begin{array}{c} CH_2-N \\ CH_2 \quad \quad \quad C-(CH_2)_n-COOR'' \\ CH_2-N \\ | \\ R' \end{array}$$ or $$\begin{array}{c} CH_2-N \\ CH_2 \quad \quad \quad C-R' \\ CH_2-N \\ \quad \quad CH_2CH_2-OCOR', \end{array}$$

as disclosed in U.S. Pat. 3,020,276 or as copolymers of acrylic or vinyl compounds and N-vinyl-tetrahydropyrimidines as disclosed in Belgian Pat. 625,362.

One skilled in the art would conclude from this state of the art that only complicated tetrahydropyrimidines are effective, and not the simple tetrahydropyrimidines, such as the 2-fatty-alkyl derivatives.

SUMMARY OF THE INVENTION

Having in mind the limitations of the prior art, it is an object of the present invention to render olefin articles antistatic.

Another object of the invention is to take advantage of the antistatic properties of amine additives while avoiding the delayed effectiveness of these compounds.

Still another object of the present invention is to provide amine additives having an uncomplicated structure and which are readily available.

The limitations of the prior art are avoided by using compositions of polyolefins containing as an antistatic agent compounds of the formula:

$$\begin{array}{c} N-CH_2 \\ R_2-C \quad \quad CH_2 \\ N-CH_2 \\ | \\ R_1 \end{array}$$

wherein $R_1$ is a branched or unbranched alkyl or alkenyl group having 6 to 26 carbon atoms, and $R_2$ is hydrogen or an alkyl or alkenyl group having 1 to 5 carbon atoms, optionally together with up to molar equivalent amounts of organic or inorganic acids.

Although a finite quantity of the antistatic agent of this invention provides a finite reduction in the accumulation of static electricity in polyolefins, the antistatic agent desirably consists of about 0.01 to 1.0 percent by weight, preferably 0.05 to 0.5 percent by weight of the polyolefin.

DESCRIPTION OF THE PREFERRED EMBODIMENTS

The antistatic agents of the present invention are added to olefin polymers having 2 to 8 carbon atoms, for example, high pressure and low pressure polymers of ethylene, propylene, 1-butene, 1-pentene, 4-methyl-1-pentene or 1-octene or other mono-α-ethylenically unsaturated hydrocarbons.

In particular the invention is useful with polyethylenes having molecular weight between 10,000 and 1,000,000, preferably between 20,000 and 150,000; polypropylenes having molecular weights between 50,000 and 800,000, preferably between 100,000 and 800,000; poly-1-butenes having molecular weights between 200,000 and 5,000,000, preferably between 300,000 and 3,000,000; poly-1-pentenes and copolymers and polymer mixtures thereof.

The antistatic agent is desirably added to copolymers of polyolefins comprising: ethylene-propylene; ethylene-butylene; propylene-butylene; ethylene-propylene-butylene. Each of these components can be present in the copolymers in an amount up to 99.9 percent by weight.

Mixtures of the foregoing olefin polymers to which the antistatic agent is desirably added include for instance:

polyethylene+polypropylene;
polyethylene+polybutylene;
polyethylene+polypropylene+polybutylene;
polyethylene+polyisobutylene;
polyethylene+ethylene-butylene-copolymer;
ethylene-propylene-copolymer+propylene-ethylene-copolymer;
polyethylene+polypropylene+ethylene-butylene-copolymer.

Each of these components can be present in the copolymers in an amount up to 99.9 percent by weight.

Suitable tetrahydropyrimidines of the formula—

$$\begin{array}{c} N-CH_2 \\ R_2-C \quad \quad CH_2 \\ N-CH_2 \\ | \\ R_1 \end{array}$$

are those wherein $R_1$ represents straight chain or branched alkyl or alkenyl groups having 6 to 26 carbon atoms, preferably 8 to 18 carbon atoms, especially 10 to 14 carbon atoms, and $R_2$ represents hydrogen or an alkyl or alkenyl group having 1 to 5 carbon atoms, preferably 1 to 3 carbon atoms.

Suitable as group $R_2$ are, for example: hydrogen, or the methyl, ethyl, propyl, n-butyl, isobutyl, butenyl, and n-pentyl radicals. Preferred are the methyl, ethyl, and propyl radicals.

Suitable as group $R_1$ are, for example, the n-hexyl, n-octyl, trimethylhexyl, n-nonyl, n-decyl, n-decenyl, n-dodecyl, n-tridecyl, n-tetradecyl, n-hexadecyl, n-octadecyl residues. Preferred are the n-decyl, n-undecenyl, n-undecyl, n-dodecyl, n-tridecyl, isotridecyl, n-tetradecyl residues, or mixtures thereof, such as, for example, the mixture of $C_{10}$- to $C_{14}$-alkyl radicals.

Suitable tetrahydropyrimidine compounds are, for instance, 1 - octadecyl - 2 - ethyl - tetrahydropyrimidine, 1 - hexacosyl - 2 - butyl - tetrahydropyrimidine, 1-hexenyl- 2 - pentyl - tetrahydropyrimidine, 1 - octadecenyl-2-methyl - tetrahydropyrimidine, 1 - trimethylhexyl - 2- propyl - tetrahydropyrimidine, 1 - hexadecyl - 2 - pentenyl-tetrahydropyrimidine, and 1 - hexadecyl-tetrahydropyrimidine.

Preferred tetrahydropyrimidine compounds are 1-n-dodecyl-2-methyl-tetrahydropyrimidine, 1-n-decyl-2-ethyl-tetrahydropyrimidine, 1-$C_{10}$- to $C_{14}$-fatty-alkyl-2-ethyl-tetrahydropyrimidine and 1 - n-tetradecyl-2-propyl- tetrahydropyrimidine.

These tetrahydropyrimidine compounds are obtained in a conventional manner by reacting correspondingly substituted 1,3-propanediamines with carboxylic acids or the derivatives thereof, such as, for example, chlorides, anhydrides, esters, or nitriles. Advantageously, the starting compounds are carboxylic acids and the substituted 1,3-propanediamines. The water produced by the reaction (2 moles per mole of tetrahydropyrimidine) is removed azeotropically from the reaction mixture. It is also possible to react 2-alkyl-substituted tetrahydropyrimidines with chloroalkanes to obtain the corresponding 1,2-disubstituted derivatives.

In addition to the above, a number of other production methods are known which, however, generally do not exhibit industrial importance.

The tetrahydropyrimidines are also employed in the form of salts with acids or in the form of mixtures from tetrahydropyrimidines and salts of tetrahydropyrimidines with acids, e.g. with mono- and dicarboxylic acids such as, for example, acetic acid, lauric acid, oleic acid, oxalic acid, tartaric acid, succinic acid, or 1,12-dodecanedioic acid and/or with hydroxycarboxylic acids such as lactic acid, glycolic acid, or ricinoleic acid or phosphoric acid, or the partial alkyl esters thereof, or with sulfonic acids such as, for example, $C_{15}$-alkane- or $C_{12}$-alkylbenzenesulfonic acids, whereby the alkaline character of the compounds is lessened or eliminated.

Suitable tetrahydropyrimidine salts are, for example, the salt of 1-n-dodecyl-2-ethyl-tetrahydropyrimidine and lauric acid; the salt of 1-tetradecyl-2-methyl-tetrahydropyrimidine and lactic acid; the salt of 1-n-decyl-2-propyl-tetrahydropyrimidine and dodecylbenzenesulfonic acid.

The salts are prepared, for example, by converting the mixture of equimolar amounts of one or several tetrahydropyrimidines and one or several carboxylic acids, optionally with heating, into a homogeneous melt by agitation, and then allowing the mixture to cool. In an alternative method both components are dissolved in suitable solvents and the combined solutions are evaporated to dryness, whereby dicoloration is extensively eliminated.

Mixtures from tetrahydropyrimidines and salts of tetrahydropyrimidines with acids are prepared by reaction of equivalent amounts of said tetrahydropyrimidines with up to molar equivalent amounts of organic or inorganic acids.

The amount of the antisatic agent incorporated into the polyolefin ranges suitably between about 0.01 and 1.0 percent by weight, based on polyolefin. Preferred are amounts of between about 0.05 to 0.5 percent by weight. With these amounts it is possible to attain complete protection against dust accumulation by electrostatic charging even in the case of very dry and warm air, without the crack resistance of the highly crystalline polyolefins being impaired to any appreciable extent. If lower concentrations are employed, for example 0.005 to 0.001 percent, based on the polyolefin, the protection against electrostatic charging is markedly reduced. Though this protection may still be sufficient in case of moist air, it is insufficient in dry air. Higher concentrations than 1.0 percent are normally unnecessary, since they do not provide further improvement. On the contrary, there is even the danger that the surface of the molded articles becomes unattractive to look at with higher concentrations, since the additive bleeds out, especially if more than 1.5 percent is added.

The antistatic agents of this invention can be incorporated into polyolefins in various ways. For example, the antistatic agent can be added to polyolefin particles and the resulting material mixed to form a homogeneous mass. For this purpose, generally any commercially available high speed mixer is suitable. The polyolefin can also be mixed first with a greater amount of the antistatic agent than desired and the composition of this mixture subsequently adjusted by the admixture of additional polyolefin therewith. It is also possible to incorporate the antistatic agent into the polyolefin directly on the mill or, for example, in the case of injection molding, in an extruder. It is also desirable to mix the antistatic agent dissolved, dispersed, suspended, or emulsified in a suitable organic solvent with polyolefin powder. Thereafter, the solvent is removed, for example, by heating the polymer to vaporize the solvent. A solvent well suited for these purposes is, for example, methanol, ethanol, dioxane, acetone, water and aqueous solutions of such organic solvents.

However, all other easily distillable solvents are suitable for this purpose.

Advantageously, other conventional agents used in polyolefins such as, for example, pigments, coloring materials, stabilizers, mold release agents, plasticizers, extenders and fillers, can be added to the polyolefins with the antistatic agent.

It is also advantageous to incorporate into the polyolefin additional substances which prevent a slight yellowing of the N-containing antistatic agents occurring during a prolonged exposure to high temperatures. Suitable stabilizers of this type are, for example, phosphates, especially didecylphenyl phosphite, decyldiphenyl phosphite, triphenyl phosphite, tris(nonylphenyl)phosphite and tris(nonylphenol+9 moles ethylene oxide) phosphite.

The color stabilizers are added in amounts of 0.1 to 0.4 percent by weight, based on the polyolefin. An addition of alkanesulfonates, e.g. sodium pentadecane-sulfonate, has a similarly favorable effect. For this purpose, approximately 0.05 to 1.0 percent by weight, based on the polyolefin, is required.

The antistatic agents of the present invention exhibit pronounced effect immediately after the manufacture of the molded article, without forming a troublesome film on the surface of the molded article. This is surprising, insofar as all analogous compounds heretofore described as being highly effective for this application, whether they are open-chain or cyclic (i.e., carboxylic acid amides, imides, and amidines; oxazolines; and imidazolines), are considerably inferior to the compounds of the present invention with respect to their antistatic effectiveness and the diffusion rate.

Without further elaboration, it is believed that one skilled in the art can, using the preceding description, utilize the present invention to its fullest extent.

The preferred tetrahydropyrimidines: 1 - n-dodecyl-2-methyl-tetrahydropyrimidine, 1 - n-decyl-2-ethyl-tetrahydropyrimidine, 1 - $C_{10}$- to $C_{14}$-fatty alkyl-2-ethyl-tetrahydropyrimidine and 1-n-tetradecyl-2-propyl-tetrahydropyrimidine are prepared, respectively, as disclosed in British Pat. 793,749, page 2, lines 2 to 10. In a preferred embodiment this process may be performed in the way described below:

These tetrahydropyrimidine compounds are obtained in a conventional manner by reacting correspondingly substituted 1,3-propane-diamines with carboxylic acids or the derivatives thereof, such as, for example, chlorides, anhydrides, esters, or nitriles. Advantageously, the starting compounds are carboxylic acids and the substituted 1,3-propane-diamines. The water produced by the reaction (2 moles per mole of tetrahydropyrimidine) is removed azeotropically from the reaction mixture. It is also possible to react 2-alkyl-substituted tetrahydropyrimidines with chloroalkanes to obtain the corresponding 1,2-disubstituted derivatives.

The tetrahydropyrimidine salts of 1-n-dodecyl-2-ethyl-tetrahydropyrimidine and lauric acid; of 1-tetradecyl-2-methyl-tetrahydropyrimidine and lactic acid; and of 1-n-decyl-2-propyl-tetrahydropyrimidine and dodecylbenzenesulfonic acid are prepared, respectively, by mixing together said tetrahydropyrimidine with said acid, the latter being in a molar amount up to the molar amount of said tetrahydropyrimidine, optionally with heating, into a homogeneous melt by agitation, and then allowing the mixture to cool. Also if the molding composition contains tetrahydropyrimidines and the acids, the salts are formed during the molding process.

EXAMPLES 1-24

Molded articles prepared from compositions of polyethylene, polypropylene and poly-1-butene and the antistatic agents of the present invention are compared with compositions outside the definition of the present invention as indicated in the tables which follow.

The antistatic behavior of the molded articles is tested by the ash dust testing method, by data regarding the dust accumulation to which the test bodies are subjected (a) in a normal atmosphere (normal dust accumulation), and (b) when sprinkled with a special powder (color powder test), and by measuring the surface resistance in accordance with DIN (German Industrial Standard) 53 482 VDE 0303, Part 3. These tests are conducted on test plates having an edge length of 42 x 250 x 320 mm.

The ash dust test is conducted in the following manner: One hour after its manufacture, the test body is rubbed vigorously ten times with, in each case, a cotton cloth and held, at a spacing of 0.5 cm., over fresh, crushed tobacco ash. The test is considered positive when the test body does not attract any ash particles (symbol: +).

Furthermore, the symbols (+)=minor ash attraction; (+−)=medium ash attraction; (−)=stronger ash attraction; and − =strong ash attraction. The test is repeated 24 hours and 8 days after the manufacture.

In case of the so-called normal dust accumulation, the test data are divided—likewise semiquantitatively—into none, very slight, slight, medium, strong, and very strong dust accumulation, observed 8 days after the manufacture.

The so-called color powder test, conducted 1 hour and 24 hours, as well as 8 days after the manufacture of the molded articles, is intended to evaluate to which extent (standard: "color separation") the two components of a mixture of red-dyed sublimed sulfur and blue-dyed lycopodium spores are attracted by different areas of the surface of the plastic (zones with red dust=regions of positive charging; zones with blue dust=regions of negative charging on the plastic surface).

TABLE 1

| No. | Polyolefin | Parts per 100 parts | Substance |
|---|---|---|---|
| 1 | Polyethylene | 0.3 | 1-dodecyl-2-ethyl-tetrahydropyrimidine. |
| 2 | do | 0.3 | 1-octadecenyl-2-propyltetrahydropyrimidine. |
| 3 | do | 0.3 | 1-hexyl-2-pentyltetrahydropyrimidine. |
| 4 | do | 0.3 | 1-$C_{10}$-$C_{14}$-fatty-alkyl-2-methyltetrahydropyrimidine. |
| 5 | do | 0.3 | 1-hexacosyl-2-methyltetrahydropyrimidine. |
| 6 | do | 0.3 | 1-hexadecyl-2-ethyltetrahydropyrimidine. |
| 7 | do | 0.3 | 1-decyl-2-butenyltetrahydropyrimidine. |
| 8 | do | 0.3 | Salt of 1-tridecenyl-2-ethyltetrahydropyrimidine and lactic acid. |
| 9 | do | 0.3 | Salt of 1-dodecyl-1-methyltetrahydropyrimidine and lauric acid. |
| 10 | For comparison: Polyethylene. | 0.3 | 1-dodecyl-2-decyltetrahydropyrimidine. |
| 11 | do | 0.3 | 1-butyl-2-propyltetrahydropyrimidine. |
| 12 | do | 0.3 | Dodecyl-N,N-dihydroxyethylamine. |
| 13 | do | 0.3 | 2-undecyloxazoline. |
| 14 | do | | Without additive. |
| 15 | Polypropylene | 0.5 | 1-tetradecyl-2-ethyltetrahydropyrimidine. |
| 16 | do | 0.5 | 1-$C_{16}$-$C_{18}$-fatty-alkyl-2-methyltetrahydropyrimidine. |
| 17 | do | 0.5 | 1-octyl-2-propyltetrahydropyrimidine. |
| 18 | For comparison: Polypropylene. | 0.5 | Tetradecyl-N,N-dihydroxyethylamine. |
| 19 | do | | Without additive. |
| 20 | Poly-1-butene | 0.5 | 1-dodecyl-2-methyltetrahydropyrimidine. |
| 21 | do | 0.5 | 1-decyl-2-propyltetrahydropyrimidine. |
| 22 | do | 0.5 | 1-octadecyl-2-pentyltetrahydropyrimidine. |
| 23 | For comparison: Poly-1-butene. | 0.5 | 1-hydroxyethyl-2-propyltetrahydropyrimidine. |
| 24 | do | | Without additive. |

TABLE 3

| No. | Surface resistance (MΩ) (45–50% relative atmospheric humidity) after— | | |
|---|---|---|---|
| | 1 hour | 24 hours | 8 days |
| 1 | 7–9·$10^4$ | 8·$10^3$–1·$10^4$ | 2–5·$10^3$ |
| 2 | 6–9·$10^5$ | 2–4·$10^5$ | 1–6·$10^4$ |
| 3 | 7·$10^5$–1·$10^6$ | 3–6·$10^5$ | 5·$10^4$ |
| 4 | 8–9·$10^4$ | 9·$10^3$–3·$10^4$ | 3–7·$10^3$ |
| 5 | 9·$10^5$ | 4–6·$10^5$ | 5–7·$10^4$ |
| 6 | 1–3·$10^5$ | 6–9·$10^4$ | 1·$10^4$ |
| 7 | 2·$10^5$ | 5–7·$10^4$ | 9·$10^3$–3·$10^4$ |
| 8 | 3–4·$10^5$ | 8·$10^4$–1·$10^5$ | 6·$10^4$ |
| 9 | 9·$10^4$–5·$10^5$ | 8·$10^4$ | 3–4·$10^4$ |
| 10 | >$10^7$ | >$10^7$ | 5–8·$10^5$ |
| 11 | >$10^7$ | >$10^7$ | >$10^7$ |
| 12 | >$10^7$ | 7·$10^4$–6·$10^5$ | 3–5·$10^4$ |
| 13 | >$10^7$ | >$10^7$ | 8·$10^5$–2·$10^6$ |
| 14 | >$10^7$ | >$10^7$ | >$10^7$ |
| 15 | 6·$10^4$–2·$10^5$ | 7–9·$10^3$ | 4–6·$10^3$ |
| 16 | 7–9·$10^3$ | 2–3·$10^5$ | 5–6·$10^4$ |
| 17 | 8·$10^5$ | 3–6·$10^5$ | 7·$10^4$ |
| 18 | >$10^7$ | 1–2·$10^5$ | 6·$10^4$ |
| 19 | >$10^7$ | >$10^7$ | >$10^7$ |
| 20 | 9·$10^4$–2·$10^5$ | 8·$10^3$–2·$10^4$ | 5·$10^3$ |
| 21 | 1–3·$10^3$ | 9·$10^3$ | 5–6·$10^3$ |
| 22 | 7·$10^5$ | 9·$10^4$–2·$10^5$ | 7–8·$10^4$ |
| 23 | >$10^7$ | >$10^7$ | 3–7·$10^6$ |
| 24 | >$10^7$ | >$10^7$ | >$10^7$ |

TABLE 4

| No. | Summary evaluation of the antistatic effectiveness after— | | |
|---|---|---|---|
| | 1 hour | 24 hours | 8 days |
| 1 | Good/Very good | Very good | Very good. |
| 2 | Good/Medium | Good | Do. |
| 3 | do | do | Do. |
| 4 | Good | Very good | Do. |
| 5 | Good/Medium | Good | Do. |
| 6 | Good | do | Do. |
| 7 | do | do | Do. |
| 8 | do | do | Do. |
| 9 | do | do | Do. |
| 10 | Very bad | Bad | Medium. |
| 11 | Bad | do | Bad. |
| 12 | Medium | Good | Good. |
| 13 | Very bad | Bad | Medium/Good. |
| 14 | | | |
| 15 | Good/Very good | Very good | Very good. |
| 16 | Good | Good | Do. |
| 17 | do | Very good | Do. |
| 18 | Bad | Good | Good. |
| 19 | | | |
| 20 | Good/Very good | Very good | Very good. |
| 21 | Good | do | Do. |
| 22 | do | Good | Do. |
| 23 | Very bad | Bad | Bad. |
| 24 | | | |

TABLE 2

| No. | Ash test after— | | | Normal dust accumulation after 8 days | Color powder test after 1 hour | Standard, 24 hours | Color separation, 8 days |
|---|---|---|---|---|---|---|---|
| | 1 hour | 24 hours | 8 days | | | | |
| 1 | + | + | + | None | None | None | None. |
| 2 | (−) | + | + | Very slight | Very slight | do | Do. |
| 3 | (−) | (+) | + | Slight | Slight | Slight | Very slight. |
| 4 | (+) | + | + | None | None | None | None. |
| 5 | (−) | + | + | Very slight | Slight | Very slight | Very slight. |
| 6 | (+) | + | + | None | Very slight | None | None. |
| 7 | (+) | + | + | do | do | do | Do. |
| 8 | (−) | + | + | Very slight | do | Very slight | Do. |
| 9 | (+) | (+) | + | do | do | do | Very slight. |
| 10 | − | − | (−) | Strong | Very strong | Strong | Strong. |
| 11 | − | − | − | Very strong | do | Very strong | Very strong. |
| 12 | − | (+) | + | Slight | Medium | Slight | None. |
| 13 | − | − | (+) | Medium | Strong | do | Very lsight. |
| 14 | − | − | − | Very strong | Very strong | Very strong | Very strong. |
| 15 | + | + | + | None | None | None | None. |
| 16 | (+) | (+) | (+) | Very slight | Very slight | do | Do. |
| 17 | (+) | (+) | + | None | do | do | Do. |
| 18 | (+) | (+) | (+) | Slight/Medium | Medium | Slight | Do. |
| 19 | − | − | − | Very strong | Very strong | Very strong | Very strong. |
| 20 | + | + | + | None | None | None | None. |
| 21 | (+) | + | + | do | do | do | Do. |
| 22 | (+) | (+) | + | Very slight | Very slight | do | Do. |
| 23 | − | − | − | Strong | Very strong | Strong | Medium. |
| 24 | − | − | − | Very strong | do | Very strong | Very strong. |

I claim:
1. An antistatic molding composition comprising a normally solid polyolefin having uniformly and intimately distributed therein from about 0.01 to 1.0 percent by weight of said polyolefin of an antistatic agent comprising tetrahydropyrimidines having the following formula

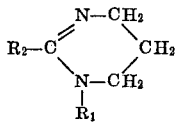

wherein
$R_1$ is selected from the group consisting of alkyl or alkenyl groups having 6 to 26 carbon atoms, and
$R_2$ is selected from the group consisting of hydrogen, alkyl groups having 1 to 5 carbon atoms or alkenyl groups having 1 to 5 carbon atoms.

2. The composition of claim 1, wherein the antistatic agent is about 0.05 to 0.5 percent by weight of said polyolefin.

3. The composition of claim 2, wherein $R_1$ has 8 to 18 carbon atoms in the alkyl or alkenyl groups, and $R_2$ has 1 to 3 carbon atoms in the alkyl or alkenyl groups.

4. The composition of claim 1 further comprising stabilizers and pigments.

5. The composition of claim 2, wherein said antistatic agent is selected from the group consisting of 1-n-dodecyl-3-methyl-tetrahydropyrimidine, 1-n-decyl-2-ethyl-tetrahydropyrimidine, 1-$C_{10}$ to $C_{14}$-fatty alkyl-2-ethyl-tetrahydropyrimidine and 1-n-tetradecyl-2-propyl-tetrahydropyrimidine.

6. The composition of claim 1, further comprising up to molar equivalent amounts of organic or inorganic acids based on said tetrahydropyrimidines, said acid selected from the group consisting of monocarboxylic acids, dicarboxylic acids, hydroxycarboxylic acids, sulfonic acids, phosphoric acid, and partial alkyl esters of phosphoric acid.

7. The composition of claim 6, wherein said acids and said tetrahydropyrimidines comprise salts.

8. The composition of claim 6, wherein said acids and said tetrahydropyrimidines comprise salts selected from the group consisting of 1-n-dodecyl-2-ethyl-tetrahydropyrimidine and lauric acid; 1-tetradecyl-2-methyl-tetrahydropyrimidine and lactic acid; and 1-n-decyl-2-propyl-tetrahydropyrimidine and dodecyl-benzene sulfonic acid.

9. The composition of claim 4 comprising as stabilizer about 0.05 to 1.0 percent by weight based on the polyolefin of sodium pentadecane sulfonate.

10. The antistatic, crack-free article molded from the compoistion of claim 1.

11. The antistatic, crack-free article molded from the composition of claim 7.

References Cited

UNITED STATES PATENTS

| 3,020,276 | 2/1962 | Hughes et al. | 252—8.8 |
| 3,210,312 | 10/1965 | Rosenberg et al. | 260—94.9 |

FOREIGN PATENTS

| 1,564,308 | 3/1969 | France. |
| 6,512,842 | 4/1966 | Netherlands. |

JAMES A. SEIDLECK, Primary Examiner

E. J. SMITH, Assistant Examiner

U.S. Cl. X.R.

260—80.78, 88.2 S, 94.9 GB, 897 A, DIG. 19